United States Patent [19]

Hamazaki et al.

[11] Patent Number: 4,655,242

[45] Date of Patent: Apr. 7, 1987

[54] WATER SEAL DRUM

[75] Inventors: Takeru Hamazaki; Noboru Hashimoto; Okitsugu Shinobu, all of Yokohama, Japan

[73] Assignee: JGC Corporation, Tokyo, Japan

[21] Appl. No.: 838,430

[22] Filed: Mar. 10, 1986

Related U.S. Application Data

[63] Continuation of Ser. No. 525,434, Aug. 22, 1983, abandoned, which is a continuation of Ser. No. 248,280, Mar. 30, 1981, abandoned.

[30] Foreign Application Priority Data

Mar. 28, 1980 [JP] Japan .................................. 55-39854

[51] Int. Cl.$^4$ ............................................. F16K 13/00
[52] U.S. Cl. ............................ 137/247.27; 137/247.35; 137/251.1; 261/124
[58] Field of Search .................... 137/247.19, 247.87, 137/247.29, 247.35, 251, 252, 253, 254, 247.15, 247.27, 247.35; 261/122, 123, 124, 25; 210/150

[56] References Cited

U.S. PATENT DOCUMENTS

| | | | |
|---|---|---|---|
| 1,436,174 | 11/1922 | Johansson | 137/251 |
| 2,403,695 | 7/1946 | Walker | 210/150 X |
| 2,670,749 | 3/1954 | Germer | 137/254 X |
| 2,891,607 | 6/1959 | Webster | 137/247.35 X |
| 3,606,985 | 4/1971 | Reed | 261/124 |
| 3,794,303 | 2/1974 | Hirshon | 261/124 X |
| 3,802,455 | 4/1974 | Zink | 137/251 |
| 3,956,432 | 5/1976 | Hilling | 261/123 X |
| 4,048,072 | 9/1977 | McCullough | 261/122 X |
| 4,368,060 | 1/1983 | Yauagiako | 261/124 X |
| 4,399,082 | 8/1983 | Becker | 261/124 |

FOREIGN PATENT DOCUMENTS

| | | | |
|---|---|---|---|
| 1104913 | 4/1961 | Fed. Rep. of Germany | 137/247.15 |
| 1582618 | 8/1969 | France | 137/251 |

Primary Examiner—Harold W. Weakley
Attorney, Agent, or Firm—Armstrong, Nikaido, Marmelstein & Kubovcik

[57] ABSTRACT

An improved water seal drum for gas comprising a vessel containing seal water, a gas introducing pipe extending downward from the upper part of the vessel, the lower end of the pipe opening beneath the water level, and a gas discharging pipe at the top of the vessel; characterized in that the gas introducing pipe is equipped with gas dispersing pipes having multiple nozzles for releasing the gas at a location above the lower end of the gas introducing pipe but beneath the water level. The drum enables stable water seaing of gas in a wide range of gas flow rates, and is particularly useful as a water seal drum for inflammable waste gases to be burned in a flare stack.

10 Claims, 20 Drawing Figures

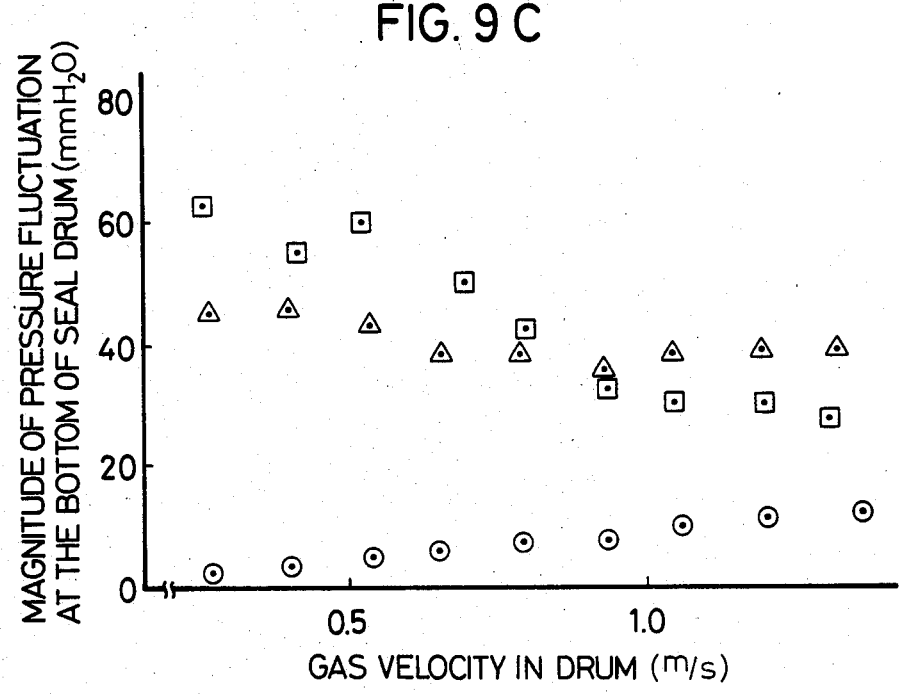

WATER SEAL DRUM

This application is a continuation of application Ser. No. 525,434 filed 8/22/83, now abandoned, which is a continuation of application Ser. No. 248,280 filed Mar. 30, 1981, now abandoned.

BACKGROUND OF THE INVENTION

1. Field of the Invention

The present invention relates to an improved water seal drum used in gas flow paths. This drum is particularly useful as a device for preventing backfire of a flare stack.

2. State of the Art

In the process of passing a gas through a water seal drum in a gas flow path, if the dispersion of the gas becomes uneven or the gas bubbles are too large, a strong sloshing of the water level occurs in a seal drum. At an increased gas flow rate, the gas blows up water into the space upper the water level in the drum. As a result, the flow of gas in a gas discharging pipe of the water seal drum becomes a pulsating flow. It is necessary to prevent such phenomenon as much as possible.

For example, a water seal drum is used in the path of the gas being transferred to a flare stack for burning. Where the function of the water seal drum is dissatisfactory, there will be a "breathing" or "growing and diminishing" of the flare, which causes the emission of a discontinuous sound and annoys the people living in the surrounding district.

In general, a water seal drum essentially comprises a vessel containing the seal water, a gas introducing pipe extending downward from the upper part of the vessel and having a lower end which opens beneath the water level, and a gas discharging pipe at the top of the vessel. Usually, the lower open end of the gas introducing pipe is serration cut or has many slits in the axial direction so that the gas may bubble up in the water.

On studying the mechanism of the water seal, we observed the following phenomena:

In the case of a relatively low gas flow rate, the bubbles conglomerate, grow large and rise up discontinuously. As a result, the water level is apt to rise up and down at the center of the vessel where the gas introducing pipe is located. When the gas flow rate is intermediate, sloshing of the water level occurs. At a further increased gas flow rate, partial blow off of water drops occur discontinuously. In this case, the flow of gas in the gas discharging pipe becomes a pulsating flow resulting in the breathing of the flame at the flare stack and the emission of a discontinuous sound. If the blowing off becomes more serious, it may even develop into an oscillation of the seal water, the level of which rises and falls within the gas discharging pipe. This phenonenon must, of course, be avoided in a water seal drum.

In order to solve such a problem in the water seal drum, it has been found effective to disperse the gas in the form of bubbles, as small as possible, uniformly into the water so as to minimize sloshing motion of the water surface. Thus, there have been various efforts made to effect the improvements. For instance, it has been proposed to provide numerous holes in the gas introducing pipe in the portion beneath the water level, or to arrange a perforated plate extending radially at the lower end of the pipe so that the gas may be dispersed through the holes or perforations. These improvements are, however, still unsatisfactory.

SUMMARY OF THE INVENTION

The object of the present invention is to provide an improved water seal drum for gas in which the gas can be dispersed uniformly in the form of small bubbles, and sloshing motion of the water surface can be suppressed over a wide range of gas flow rates.

DRAWINGS

FIG. 2A is a plan view; and FIG. 2B is a side view, in which some of the gas dispersing pipes are cut away.

FIGS. 3A and 3B are figures corresponding to FIGS. 2B and 2A, respectively.

FIGS. 4A and 4B, FIGS. 5A, 5B and 5C are plan views; and FIG. 4C and FIG. 5D are side views.

FIG. 6A show the longitudinal section; and FIG. 6B, the cross section.

FIG. 8A shows the vertical cross section, and FIG. 8B shows the horizontal cross section.

Figure 9A:
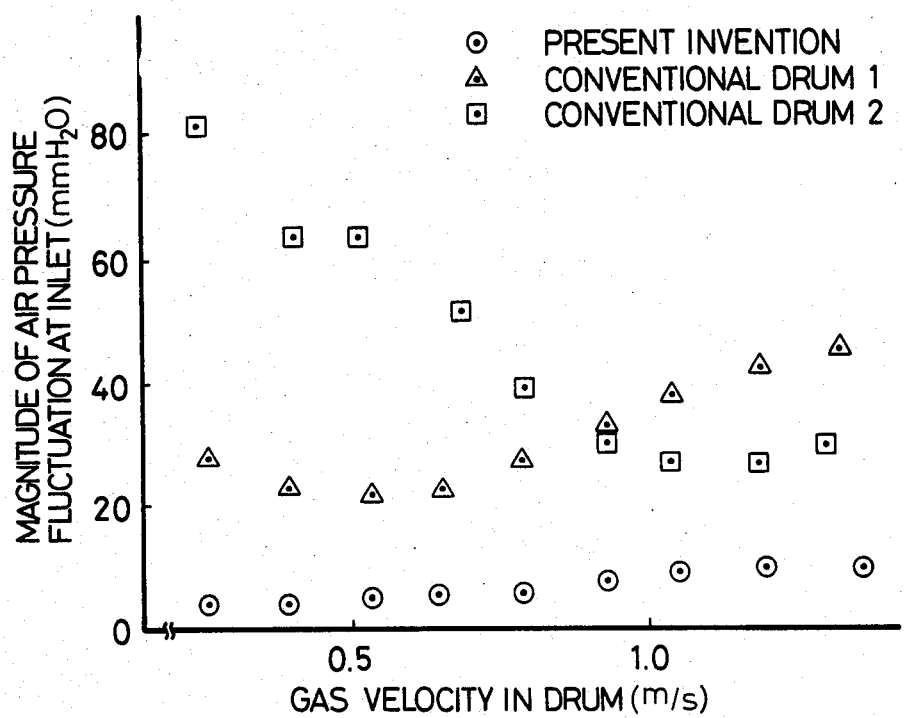
Figure 9B:
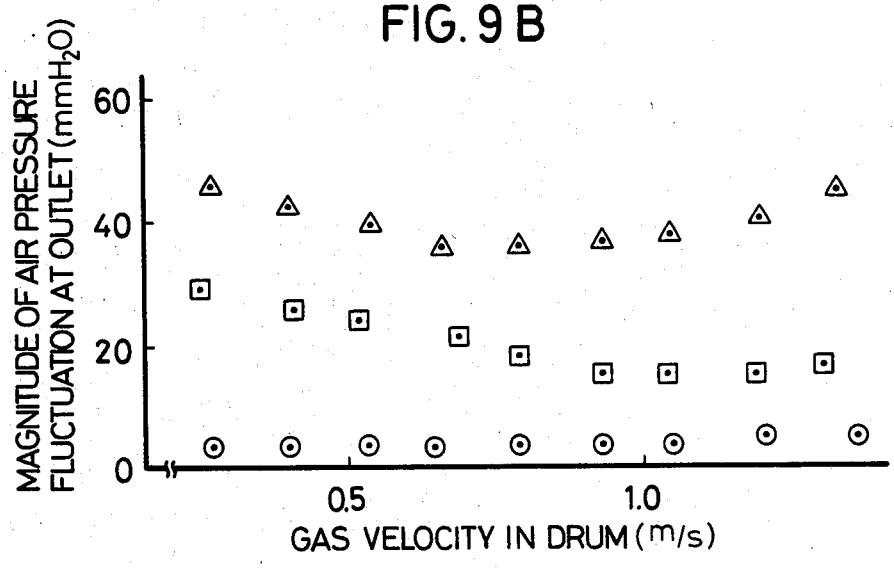

FIGS. 9A, 9B and 9C are graphs showing the performance of the present water seal drum in comparison with conventional water seal drums. FIG. 9A shows the magnitude of pressure fluctuation of the air at inlet of the drum; FIG. 9B, the magnitude of pressure fluctuation of the air at outlet of the drum; and FIG. 9C, the magnitude of pressure fluctuation at the bottom of the seal drum. All the data of pressure fluctuation are correlated to the gas velocity in the drum.

DETAILED DESCRIPTION OF PREFERRED EMBODIMENTS

The present invention will be described in detail below with reference to FIG. 1 which shows a typical embodiment of the present water seal drum.

The drum 1 essentially comprises a vessel 3 containing seal water 2, a gas introducing pipe 4 extending downward from the upper part of the vessel, the lower end 41 of the pipe opening beneath the water level, and a gas discharging pipe 5 at the top of the vessel; and is characterrized in that the gas introducing pipe 4 is equipped with radially arranged gas dispersing pipes 6 having multiple nozzles 61 for releasing gas at the location above the lower end 41 of the gas introducing pipe 4 but beneath the water level WL.

The lower end 41 of the gas introducing pipe is open, as in the conventional water seal drums. This is to promote quick release of a large amount of gas in the event of an emergency through the water seal without appreciable increase of pressure drop of the gas. The configuration of the lower end 41 may be the serration as shown in the Figure or the like so as to intend to promote uniform gas flow. The leg of the gas introducing pipe should be designed to have such a length H that the gas may release through the nozzles 61 of the gas dispersing pipes 6 and may not reach the lower end 41 as long as the gas flow rate is in the normal range.

The diameter and the number of the gas dispersing pipe 6, and the diameter and the number of the nozzles for releasing the gas depend mainly on the pressure drop of the gas and the extent of the sloshing motion allowable in the water seal drum. It is of course desirable to minimize the pressure drop, and at the same time, to suppress the sloshing motion of the seal water to the utmost. In general, however, these two are mutually contradictory.

In order to decrease the pressure drop, it is advantageous to use a small number of gas dispersing pipes of a larger diameter. This will impair the uniformity of the bubbles, and the sloshing motion will be significant. On the other hand, in order to suppress the sloshing motion, it is helpful to use as many gas dispersing pipes as possible so as to uniformly release the bubbles at one horizontal cross section of the seal water. However, if a large number of gas dispersing pipes are to be attached to the outer surface of the gas introducing pipe on one cross sectional plane thereof, the diameter of each gas dispersing pipe will inevitably be small. This results in a smaller total sectional area of the gas dispersing pipes, and therefore, causes a higher pressure drop in the gas dispersing pipes.

To accommodate these contradictroy factors to relatively satisfactory extent, it is recommended that the gas introducing pipe be provided with eight gas dispersing pipes on its outer surface, having the maximum possible diameter.

Figure 2:
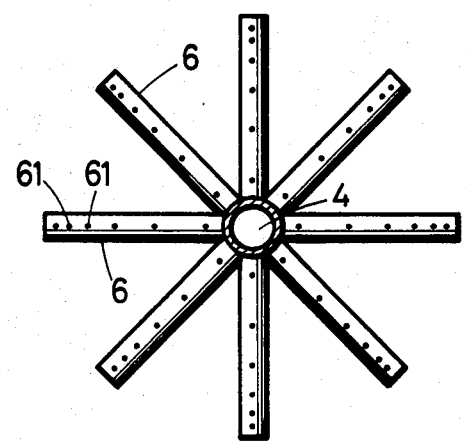
FIGS. 2A and 2B show an embodiment of attaching the gas dispersing pipes, which are characteristic parts of the seal drum, to the gas introducing pipe.
Figure 2:
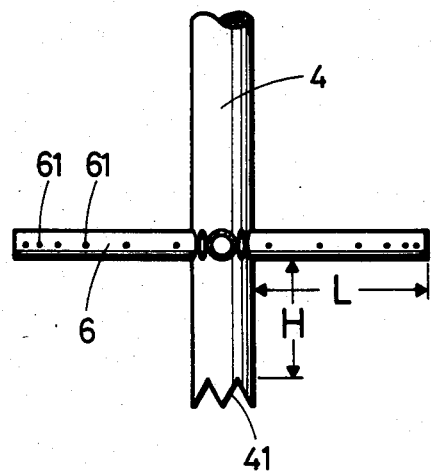

The above recommended embodiment using eight gas dispersing pipes is shown in FIGS. 2A and 2B. FIG. 2A is a plan view; and FIG. 2B is a side view, in which three pipes on the near side are cut away.

Figure 3:
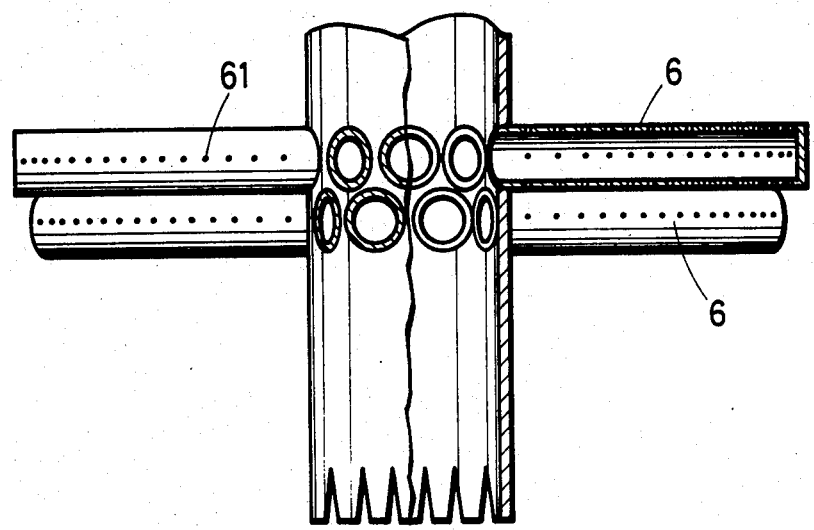
FIGS. 3A and 3B show another embodiment of the gas dispersing pipes which are attached to the gas introducing pipe in the upper and lower two stages.
Figure 3:
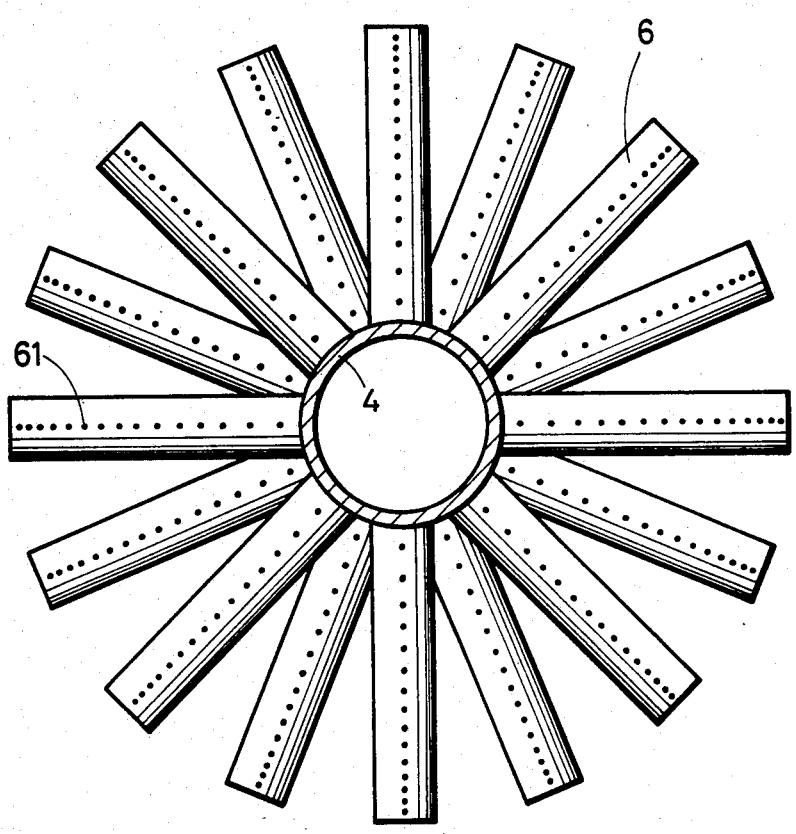

Even though the gas introducing pipe is equipped with a maximum of eight gas dispersing pipes using a commercially available pipe, the total sectional area of the gas dispersing pipes amounts to only about 60% of the sectional area of the gas introducing pipe. Consequently, it is preferable to install two or more stages of gas dispersing pipes, with minimum distance between the stages. FIGS. 3A and 3B show the gas dispersing pipes in two stages with eight pipes per stage. In this and similar embodiments, care should be taken to ensure that the pipes of the upper and the lower stages do not overlap, so as to avoid a coalescence of the bubbles and to realize uniform release of the gas.

Figure 4:
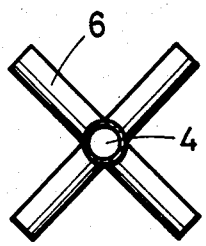
FIG. 4 and FIG. 5 show various embodiments of attaching the gas dispersing pipes.
Figure 4:
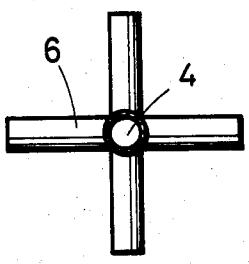
Figure 4:
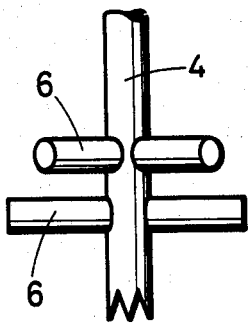
Figure 5:
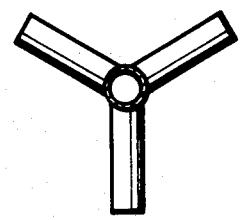
Figure 5:
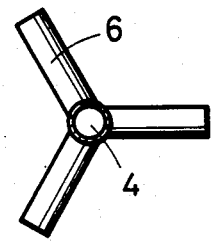
Figure 5:
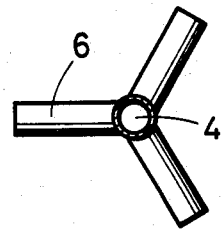
Figure 5:
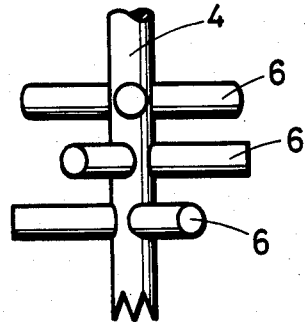

The gas dispersing pipes include various types as shown in FIG. 4 and FIG. 5.

The following description concerns the nozzles for releasing the gas.

It is suitable to choose a total area of the nozzles in the range up to 1.2 times the sectional area of the gas introducing pipe. Generally speaking, a smaller total area of the nozzles is favorable for the uniform gas flow, but the pressure drop will increase. At a larger total area, contrary to the above, the pressure drop will be low. However, a total area exceeding the above limit will not be so helpful for decreasing the pressure drop. Besides, experience shows that, when the gas is of a small amount, channelling flow thereof occurs, causing a sloshing motion in the seal water. So, the design should to promote uniform gas release taking into account the allowable pressure drop. The above described installation of the gas dispersing pipes in plural stages at a minimum interval will bring about the advantage of better dispersibility of the gas with a relatively large total area of the nozzles.

Distribution of the nozzles of the gas dispersing pipes should be so arranged along the axis of the pipe that the opening area (the ratio of the nozzle open area to the surface area of the gas dispersing pipe) increases from the base to the end of the pipe. Supposing that the cross section of the vessel of the water seal drum is divided into concentrical annular zones having the same width, the nearer the zone close to periphery, the larger the area. As described above, the gas dispersing pipes are radially installed, and therefore, it might be readily understood that, in order to realize uniform gas release, the gas dispersing pipes should have the nozzle opening areas proportional to the difference of the zone areas.

Figure 6:
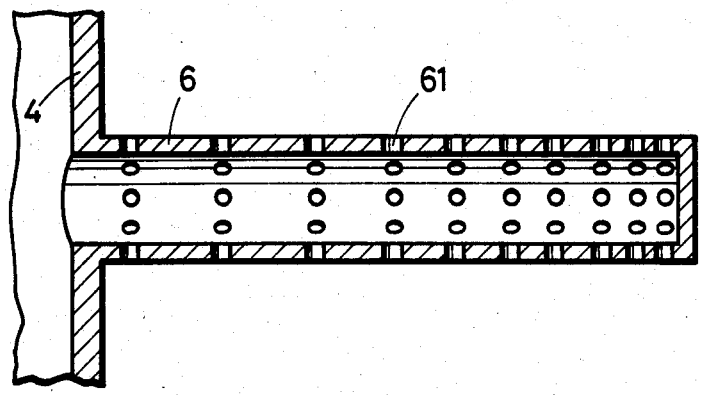
FIGS. 6A and 6B are enlarged sectional views of a gas dispersing pipe showing the distribution of the nozzles for release of gas.
Figure 6:
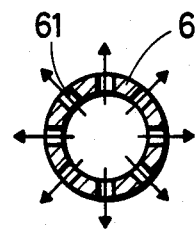

For the purpose of providing such opening areas, there are two ways: varying pitch of the nozzles and varying diameters of the nozzles along the axis of the gas dispersing pipes. The former way is preferable for the reason explained later. FIGS. 6A and 6B show the preferred example, in which the distances between two adjacent nozzles become shorter at the outer part along the axis of the pipes.

With respect to the circumferencial direction, it is preferable to distribute about eight nozzles over the circumference, as shown in FIG. 6B. When the gas flow rate is low, the seal water comes into the gas dispersing pipes, and, for example, the nozzles of only the uppermost and both sides thereof are used. If the amount of the gas increases, the water in the pipes will be gradually driven away, and the gas begins to release also through the side nozzles, and further, from the lowermost nozzles. Thus, stable and uniform release of the gas is realized.

The diameter of the nozzles is preferably small, because the larger bubbles apt to cause sloshing motion of the seal water. However, the smaller the diameter, the larger number of drilling it necessitates. This requires excessive workload for manufacturing the device, and moreover, because the smaller distance between the adjusctent nozzles result in coalescence of the bubbles, which abates the expected advantage. According to our experience, a diameter of 3 to 15 mm, particularly 5 to 10 mm is suitable. The fact that a suitable nozzle diameter is in a certain limited range means that there is a limitation in varying the nozzle diameters as a way of giving the varied opening areas along the axis of the gas dispersing pipes.

There is no specific limitation on the length L of the gas dispersing pipe. It would be easy to find out the length of the pipe necessary for providing the nozzles having a suitable diameter and being arranged at not too short intervals of the number necessary for giving a total nozzle area, at a given practical drum.

Figure 7:
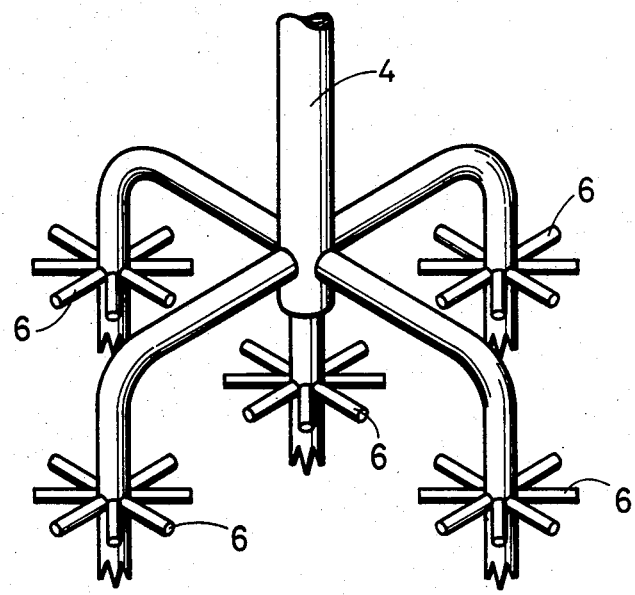
FIG. 7 is a perspective view of a further combination of the gas introducing pipe and the gas dispersing pipes.

The above explanation concerning the present water seal drum concentrates on the embodiments which use a vertical type vessel of cylindrical cross section, and have one gas introducing pipe at the center of the vessel. The present invention of course includes other various embodiments. For example, as shown in FIG. 7, the gas introducing pipe 4 may consist of plural pipes, each of which is equipped with a suitable number of the gas dispersing pipes 6. This is an embodiment suitable for a device of large capacity.

Figure 8A:
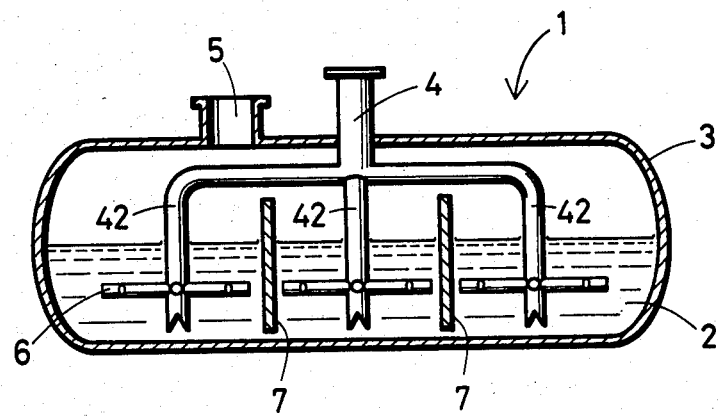
FIGS. 8A and 8B show different embodiments of the present water seal drum.
Figure 8B:
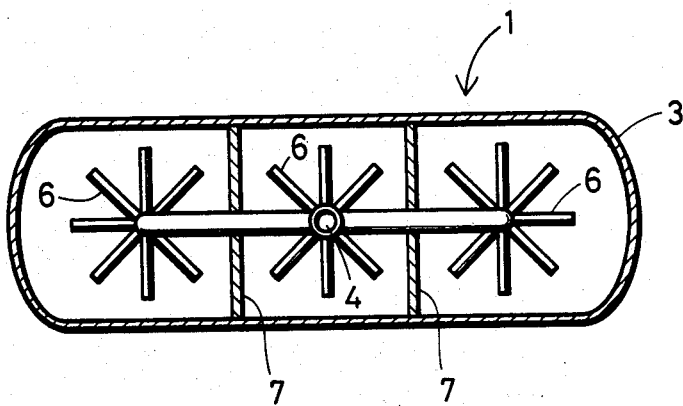

Alternatively, as shown in FIGS. 8A and 8B, a horizontal type vessel 3 may be used, and the gas introducing pipe may be divided into three pipes 42, 42 and 42 as shown, or so. In this embodiment, it is recommended that each set of gas dispersing pipes are separated with a separator 7. The separators baffle the horizontal movement of the seal water 2, and as a result, they prevent sloshing motion of the water surface, particularly, oscillation in the longitudinal direction.

The present water seal drum releases the gas uniformly in the form of small bubbles, and therefore, only a slight sloshing motion of the seal water occurs and there is no problem of pulsation in the drum even if the flow rate of the gas varies. Thus, the drum exhibits remarkable flexibility against a wide fluctuation of gas flow rate, and provide consistently stable water sealing.

Because the sloshing motion of the water level is very slight as mentioned above, depth WSL of the seal water can be very small. Conventional devices need a WSL of 10 cm or more, but only 5 cm or less of WSL suffices the present drum. Our experiments showed that the sloshing motion will be less significant at a smaller WSL. Accordingly, a small WSL not only results in less pressure drop of the gas, but also contributes to the object of the present invention, namely, providing a stable water seal.

As a further merit of this drum, it should be pointed out that, even in cases where an extremely large amount of gas is suddenly supplied to the drum, the gas could easily pass through the drum because of the structural features of the present drum.

The present drum can be constructed easily due to its simple structure, and the cost is low. The drum is applicable to any gas to be sealed. It will exhibit its greatest merit when used as a water seal drum for inflammable waste gases to be burned in a flare stack, such as the gases which are generated in petroleum refining or petrochemical processes or the like, in varying quantities due to changes in process conditions.

EXAMPLE

Figure 1:
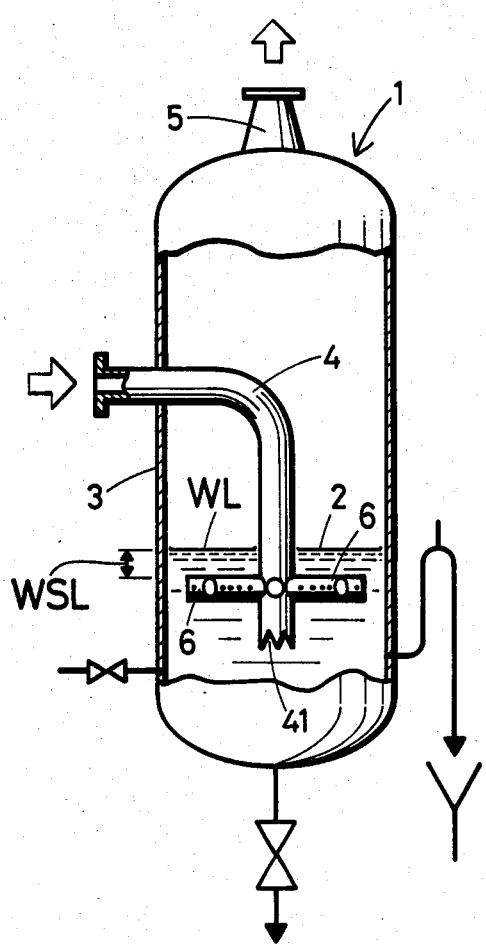
FIG. 1 is a sectional view schematically showing the present water seal drum.

A water seal drum of the type shown in FIG. 1 and having the gas dispersing pipes as shown in FIGS. 3A and 3B was constructed. The drum was subjected to tests under various flow rates of air.

The obtained data on the magnitude of air pressure fluctuation at the inlet of the drum, the magnitude of air pressure fluctuation at the outlet of the drum, and the magnitude of pressure fluctuation of seal water at the bottom of the vessel were correlated with the gas velocity in the vessel. (The diameter of the nozzles is 5 mm, and the WSL is 100 mm.)

For the purpose of comparison, the following drums according to the conventional technology were constructed and subjected to the same air seal test as noted above with WSL of 100 mm.

Conventional Drum I—The drum has no gas dispersing pipe, but has many holes of 3 mm diameter on the lower part of a gas introducing pipe, and the lower end of the pipe being serrations.

Conventional Drum II—The drum has a gas introducing pipe equipped with a radially extending disk having many perforations of 3 mm diameter, with a short skirt extending downward from the circumference of the disk.

The data are plotted on FIGS. 9A, 9B and 9C. These graphs clearly show that the water seal drum according to the present invention provides the expected stable water seal in a wide range of gas flow rates.

We claim:

1. A water seal drum for gas essentially comprising a vessel containing seal water, a gas introducing pipe extending downward from the upper part of the vessel, the lower end of the pipe opening beneath the water level, a gas discharging pipe at the top of the vessel, and means for minimizing sloshing and for uniformly releasing gas bubbles at a horizontal cross-section of the seal water; the means including gas dispersing pipes radially and horizontally arranged about the gas introducing pipe, the gas dispersing pipes having circumferentially arranged nozzles for releasing the gas at a position above the lower end of the gas introducing pipe but beneath the water level, and the nozzles having an open area of the nozzle increasing from the base to the end of the gas dispersing pipes, thereby minimizing sloshing and uniformly releasing gas bubbles at a horizontal cross-section of the seal water.

2. A water seal drum according to claim 1, wherein the gas dispersing pipes are divided into two or more stages and the stages are distributed in different positions along the axis of the pipe.

3. A water seal drum according to claim 1, wherein the nozzles have a total open area up to 1.2 times the sectional area of the gas introducing pipe.

4. A water seal drum according to claim 1, wherein the diameter of the nozzles is 3 to 15 mm, preferably 5 to 10 mm.

5. A water seal drum according to claim 1, wherein the vessel is of a vertical type.

6. A water seal drum according to claim 1, wherein the vessel is of a horizontal type.

7. A water seal drum according to claim 1, wherein the drum has plural gas introducing pipes, and each gas introducing pipe has gas dispersing pipes.

8. A water seal drum according to claim 1, which is used as a backfire preventing device for a flare stack.

9. A water seal drum according to claim 1, wherein the nozzles of the gas dispersing pipes have the same diameter and the distance between two adjacent nozzles decreases from the base to the end of the gas dispersing pipes, thereby increasing the open area of the nozzles from the base to the end of the gas dispersing pipes.

10. A water seal drum for preventing gas backfire in a flare atack essentially comprising a vessel containing water seal, a plurality of gas introducing pipes extending downward from the upper part of the vessel, the lower end of the plurality of gas introducing pipes opening beneath the water level, and a gas discharging pipe at the top of the vessel and means for minimizing sloshing and uniformly releasing gas bubbles at a horizontal cross-section of the seal water; the means including the plurality of gas introducing pipes, each equipped with radially and horizontally arranged gas dispersing pipes having circumferentially arranged multiple nozzles for releasing the gas at a position above the lower end of the gas introducing pipes but beneath the water level; the gas dispersing pipes are divided into two or more stages, the stages are distributed in different positions along the axis of the pipes; and the nozzles for releasing the gas have an open diameter of 3 to 15 mm, an open area of the nozzles increasing from the base to the end of the gas dispersing pipes, and a total open area up to 1.2 times the sectional area of the plurality of the gas introducing pipes, thereby minimizing sloshing and uniformly releasing gas bubbles at a horizontal cross-section of the seal water.

* * * * *